United States Patent [19]

Tamitani

[11] Patent Number: 5,014,189
[45] Date of Patent: May 7, 1991

[54] PROCESSOR ARRAY COMPRISING PROCESSORS CONNECTED SELECTIVELY IN SERIES OR IN PARALLEL

[75] Inventor: Ichiro Tamitani, Tokyo, Japan

[73] Assignee: NEC Corporation, Japan

[21] Appl. No.: 465,529

[22] Filed: Jan. 17, 1990

Related U.S. Application Data

[63] Continuation of Ser. No. 67,377, Jun. 26, 1987, abandoned.

[30] Foreign Application Priority Data

Jun. 27, 1986 [JP] Japan .................. 61-149438
Oct. 31, 1986 [JP] Japan .................. 61-258386

[51] Int. Cl.$^5$ .................. G06F 15/80; G06F 15/16
[52] U.S. Cl. .................. 364/200; 364/229.4; 364/231.9; 364/232.7

[56] References Cited

U.S. PATENT DOCUMENTS

| | | | |
|---|---|---|---|
| 4,384,273 | 5/1983 | Ackland et al. | 382/34 |
| 4,542,455 | 9/1985 | Demeure | 364/200 |
| 4,574,345 | 3/1986 | Konesky | 364/200 |
| 4,707,833 | 11/1987 | Tamara | 371/15 |

*Primary Examiner*—Gareth D. Shaw
*Assistant Examiner*—Kakali Chaki
*Attorney, Agent, or Firm*—Laff, Whitesel, Conte & Saret

[57] ABSTRACT

A processor array has first through N-th processor. Each of first through (N-1)-th switching devices is connected between preceding and succeeding consecutively numbered ones of the first through the N-th processors. Each processor has at least one processor module coupled between a processor input bus and a processor output bus. A controlling unit controls the switching devices so that the input and output buses of the processor are selectively connected together. Each processor includes a feedback bus which is connected to the module. The (N-1)-th switching devices are controlled so that the feedback buses of the processor are selectively connected in series in compliance with the manner in which the processor input and output buses of the processors are connected together. The controlling unit may also control the processor modules of each processor. The processor modules of one or more processors may process partial blocks of each principal block of a digital video signal, respectively, throughout a time duration of the principal block. The control unit may put the processor modules into operation either only one in each time duration or repeatedly in a time division fashion.

10 Claims, 7 Drawing Sheets

PROCESSOR ARRAY COMPRISING PROCESSORS CONNECTED SELECTIVELY IN SERIES OR IN PARALLEL

This application is a continuation of application Ser. No. 07/067,377, filed 6/26/87.

BACKGROUND OF THE INVENTION

This invention relates to a processor array comprising a plurality of processors. The processor array is for use in carrying out real-time digital processing of an array input signal which is typically a digital video signal. The real-time digital processing is, for example, spatial or temporal filtering of the digital video signal, interframe coding, or intraframe coding. The filtering and the interframe and the intraframe coding are known in the art.

A processor array is disclosed in a prior patent application which was filed June 9, 1987, by Hidenobu Harasaki, Ichiro Tamitani, and Yukio Endo for assignment to the present assignee. The above-named Ichiro Tamitani is the instant applicant. In the prior patent application, the processor array is called a real-time video signal processing device and comprises one or two processors, each processor comprising a plurality of processor modules. The processor and the processor module are named a video signal processor and a signal processing module, respectively, in the prior patent application.

Various conventional processor arrays are described in the prior patent application. In any one of the conventional processor arrays and of the processor array of the prior patent application, each processor is for processing an input digital video signal having a frame period into an output digital video signal with the input digital video signal divided into a succession of principal blocks.

Each principal block may be in a form of one picture of the input digital video signal and has therefore a picture period which is equal to the frame period. That is, the input digital signal is in the form of a succession of the principal blocks. Each principal block is divided into a predetermined number m of partial blocks so that the partial blocks overlap one on another at their peripheral parts, where m represents a predetermined integer which is greater than one.

Alternatively, each principal block may be in another form of a preselected number n of scanning lines of the input digital video signal, where n represents a positive integer. In this case, each principal block has a time duration which is shorter than the frame period. In this case, division of each principal block is similar to that of the above-mentioned case except that each principal block is divided into the predetermined number m of partial blocks with each scanning line divided into the respective partial blocks.

A plurality of processor modules of each processor are for processing the respective partial blocks of each principal block into processed signals during the picture period, respectively, when each principal block is composed of one picture. When each principal block is composed the preselected number n of scanning lines, the processor modules of each processor process the respective partial blocks of each principal block during the time duration, respectively.

In either processor array, it is possible to easily carry out real-time processing by increasing the number of the processor modules of the processor array.

Any one of the conventional processor arrays and of the processor array of the prior patent application is, however, defective in that it is impossible to change the number of the processor modules of the processor array without modification of the architecture of the processor array. From this viewpoint, it is desirable to easily connect a plurality of the processors in parallel.

It is also desirable to easily connect a plurality of the processors in series, that is in a pipeline fashion. More specifically, in motion-compensated interframe coding, it is general that noise reduction process, such as spatial and/or temporal filtering of the input digital video signal, is carried out as a preceding process before the input digital video signal is subjected to interframe coding used as a succeeding process. The filtering is carried out to elevate correlation between pictures. In such a case, successive processing of the filtering and the interframe coding must be carried out by two processors connected in series or in cascade. This is because the interframe coding should be carried out so that the partial blocks overlap one on another at their peripheral parts, although it is preferable for the partial blocks to fail to overlap one on another in the filtering so as to save superfluous calculation. This problem on the overlap is known in the art.

Moreover, without modification of the processor array, either processor array can not be operable in a case where the preceding and the succeeding processes are different in complexity of processing.

SUMMARY OF THE INVENTION

It is therefore an object of this invention to provide a processor array in which a plurality of processors are connected selectively in series or in parallel.

Other objects of this invention will become clear as the description proceeds.

According to this invention, a processor array has an array input bus; an array output bus; and first through N-th processors, N being representative of predetermined integer which is at least one. Each processor has processor input bus, a processor output bus, and at least one processor module coupled between the processor input and output buses. The processor input bus of the first processor is connected to the array input bus. The processor output bus of the N-th processor is connected to the array output bus. First through (N-1)-th switching are provided between preceding and succeeding ones of the first through the N-th processors. Controlling means control the first through the (N-1)-th switching devices so that the processor input and output buses of the first through the N-th processors are selectively connected together.

Typically, the processor array comprises only the first and the second processors. The switching device, only one in number, is controlled to connect the processor modules of the first and the second processors in parallel. The processor array is operable in this event like a processor array which is revealed in the prior patent application as comprising a single processor. Alternatively, the processor array may comprise the first through the fourth processors. The first and the third switching devices are controlled to connect the processor modules of the first and the second processors in parallel and those of the third and the fourth processors also in parallel. The second switching device alone is controlled to connect an aggregate of the first and the second processors and another aggregate of the third and the fourth processors in cascade. In this latter event, the processor array is operable like a processor array which is described in the prior patent application as comprising a first and a second processor.

DESCRIPTION OF THE PREFERRED EMBODIMENTS

Figure 1:
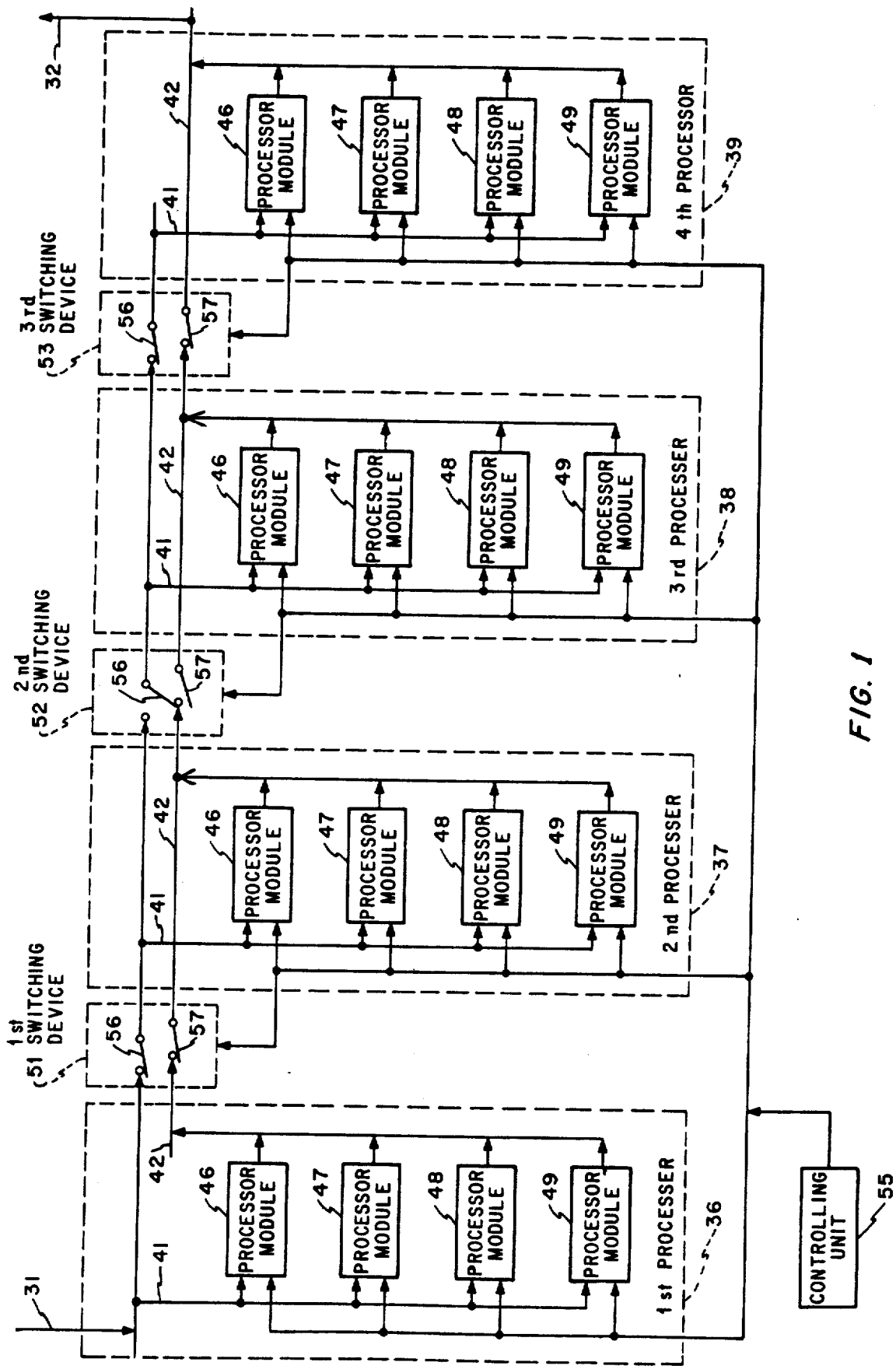
FIG. 1 is a block diagram of a processor array according to a first embodiment of this invention.

Referring to FIG. 1, a processor array according to a first embodiment of this invention comprises an array input bus 31, an array output bus 32, and first through fourth processors 36, 37, 38, and 39. In general, the processor array comprises first through N-th processors where N represents a predetermined integer which is at least one.

Each of the processors 36 through 39 comprises a processor input bus 41, a processor output bus 42, and at least one processor module connected between the processor input and output buses 41 and 42. In the example being illustrated, each of the processors 36 to 9 comprises first through fourth processor modules 46, 7, 48, and 49. Operation of the processor modules 46 through 49 will later be described.

The processor input bus 41 of the first processor 36 is connected to the array input bus 31. The processor output bus 42 of the fourth processor 39 is connected to the array output bus 32.

The processor array comprises first through (N-1)-th switching devices, such as first through third switching devices 51, 52, and 53, each connected between preceding and succeeding processors of two consecutively numbered ones of the first through fourth processors 36 to 39. More specifically, the first switching device 51 is connected between the first and the second processors 6 and 37. Likewise, the second and the third switching devices 52 and 53 are connected between the second and the third processors 37 and 38 and between the third and the fourth processors 38 and 39, respectively. Details of each switching device will presently be described.

A controlling unit 55 is, for example, a host computer and is for controlling the first through the third switching devices 51 through 53 so that the processor input and output buses 41 and 42 of the first through the fourth processors 36 through 39 are selectively connected together. The controlling unit 55 is for furthermore controlling the processor modules 46 through 49 of each processor so that the processor modules 46 through 49 of each processor are selectively operable in the case where each processor comprises two or more processor modules. Operation of the controlling unit 55 will later be described in detail.

Each of the first through the third switching devices 51 through 53 comprises first and second switching units 56 and 57 depicted as mechanical switch arms. Each switching unit is placed between the preceding and the succeeding processors.

Attention will be directed to the first and the second switching units 56 and 57 of the first switching device 51. The controlling unit 55 controls the first switching unit 56 of the switching device 51 so that one of the processor input and output buses 41 and 42 of the preceding processor 36 is selectively connected to the processor input bus 41 of the succeeding processor 37. The controlling unit 55 further controls the second switching unit 57 of the first switching device 51 so that the processor output bus 42 of the preceding processor 36 is connected to the processor output bus 42 of the succeeding processor 37 only when the controlling unit 55 controls the first switching unit 56 of the first switching device 51 so that the processor input bus 41 of the preceding processor 36 is connected to the processor input bus 41 of the succeeding processor 37. In the first switching device 51 being illustrated, the first switching unit 56 connects the processor input buses 41 of the first and the second processors 36 and 37 together. The second switching unit 57 connects the processor output buses 42 of the first and the second processors 36 and 37 together. In this case, the preceding processor 36 and the succeeding processor 37 are connected in parallel as exemplified in FIG. 1. Such a connection mode of the switching device will therefore be referred to as a parallel connection mode.

Attention will be directed to the second switching device 52. When the controlling unit 55 controls the first switching unit 56 of the second switching device 52 so that the processor output bus 42 of the preceding processor 37 is connected to the processor input bus 41 of the succeeding processor 38, the controlling unit 55 controls the second switching unit 57 of the second switching device 52 so that the processor output bus 42 of the preceding processor 37 is disconnected from the processor output bus 42 of the succeeding processor 38 as illustrated in FIG. 1. In this case, the preceding processor 37 and the succeeding processor 38 are connected in series or in cascade. Such a connection mode of the switching device will therefore be referred to as a series connection mode.

The third switching device 53 carries out the parallel connection mode as is the case with the first switching device 51. That is, the third processor 38 and the fourth processor 39 are connected in parallel by the third switching device 53.

When the controlling unit 55 controls the switching devices 51 through 53 in the manner exemplified in FIG. 1, the processor array is operable in a pipeline fashion having first and second pipeline stages. The first pipeline stage comprises eight processor modules, that is, the processor modules 46 through 49 of the first and the second processor 36 and 37. The second pipeline stage comprises eight processor modules of the third and the fourth processors 38 and 39.

Description will now be made as regards an example of operation of the processor array illustrated in FIG. 1. The array input bus 31 is for supplying the processor input buses 41 of the first and the second processors 36 and 37 with an array input signal as a first stage input signal of the first pipeline stage formed by the first and the second processors 36 and 37 connected in parallel. The array input signal has a frame period and is a digital video signal of a form of a succession of principal blocks. As described in the preamble of the instant specification, each principal block is in a form of at least one scanning line of the array input signal and has a time duration which is shorter than or equal to the frame period. Each principal block is divisible into at least two partial blocks. It will be assumed that each principal block is divisible into eight partial blocks.

Inasmuch as the first and the second processors 36 and 37 are connected in parallel to form the first pipeline stage in the example being illustrated, the controlling unit 55 controls the eight processor modules of the first and the second processors 36 and 37 so that the eight processor modules of the first and the second processors 36 and 37 are in correspondence to the respective partial blocks of each principal block. In this manner, the eight processor modules are used to process the respective partial blocks of each principal block into first-stage processed signals during the time duration, respectively, to produce the first-stage processed signals collectively as a first stage output signal. The first stage output signal has also the frame period and is a digital video signal of a form of a succession of principal blocks like the array input signal. Each principal block of the first stage output signal is also divisible into eight partial blocks.

The first stage output signal is supplied through the second switching device 52 to the second pipeline stage as a second stage input signal of the second pipeline stage. The second pipeline stage is formed by the third and the fourth processors 38 and 39 connected in parallel as mentioned above. Like in the first pipeline stage, the controlling unit 55 controls eight processor modules of the third and the fourth processors 38 and 39 so that the eight processor modules of the third and the fourth processors 38 and 39 process the respective partial blocks of each principal block of the second stage input signal into second-stage processed signals during the time duration, respectively, to produce the second-stage processed signal as a second stage output signal. The second stage output signal is supplied through the array output bus 32 to an external device (not shown) as an array output signal of the processor array.

The first and the second pipeline stages can be used to carry out, for example, the above-mentioned spatial filtering or the like of the first and the second stage input signals, respectively.

Figure 2:
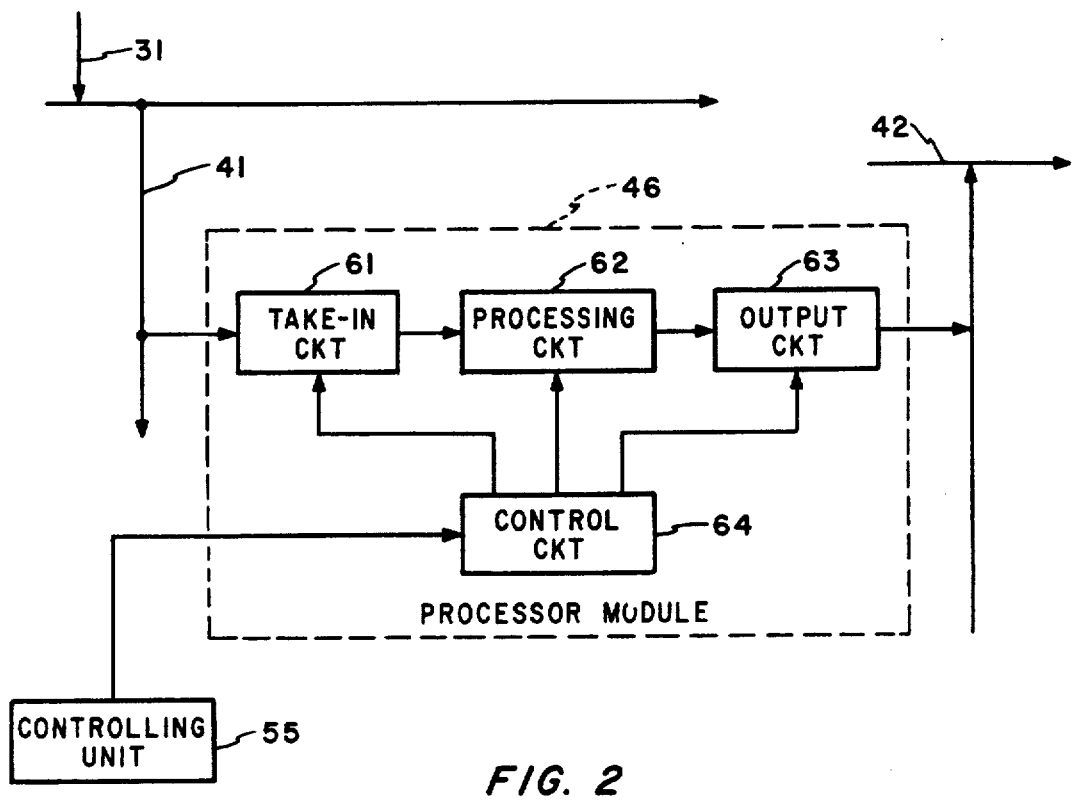
FIG. 2 is a block diagram of a processor module which is used in the processor array illustrated in FIG. 1.

Referring to FIG. 2, description will now be made in detail as regards the processor module 46 of the first processor 36. It should be noted here that remaining processor modules of the first through the fourth processors 36 through 39 of the processor array illustrated in FIG. 1 are substantially same in structure as the processor module 46 of the first processor 36.

The processor module 46 comprises a take-in circuit 61, a processing circuit 62, an output circuit 63, and a control circuit 64.

The control circuit 64 decodes a command produced by the controlling unit 55 and controls operation of the take-in, the processing, and the output circuits 61, 62, and 63.

The processing circuit 62 comprises a microcomputer and a program memory (not shown) for storing a program. The program is preliminarily supplied to the program memory from the controlling unit 55 through the control circuit 64.

The take-in circuit 61 comprises an input data memory (not shown). Data of the partial block are received through the processor input bus 41 and written in the input data memory in accordance with a first instruction signal sent from the control circuit 64.

The control circuit 64 supplies a second instruction signal to the processing circuit 62 when the take-in circuit 61 takes in the data which are needed for processing by the processing circuit 62. The microcomputer of the processing circuit 62 reads the data out of the input data memory in accordance with the second instruction signal. The processing circuit 62 carries out the processing of the data into the above-mentioned first-stage processed signal during the time duration. The processing is, for example, the spatial filtering.

The output circuit 63 comprises an output data memory (not shown). The first-stage processed signal is written in the output data memory. In accordance with a third instruction signal from the control circuit 64, the output circuit 63 reads the first-stage processed signal out of the output data memory to deliver the first-stage processed signal to the processor output bus 42 as the first stage output signal.

Similar operation is carries out by the remaining processor modules of the first through the fourth processors 36 through 39 illustrated in FIG. 1.

Referring back to FIG. 1, description will proceed to various connection configurations of the processors of the processor array. In the example being illustrated, the number N of the processors 36 through 39 is four. Inasmuch as the number of the switching devices 51 through 53 is therefore three, it is possible to realize eight sorts of the connection configurations by switching three switching devices 51, 52, and 53 in the processor array. That is, the number of sorts of the connection configurations in the processor array is represented by $$2^{N-1} = 2^3 = 8.$$

All of the eight sorts of connection configurations are illustrated in FIGS. 3 through 10.

As is apparent from FIGS. 3 through 10, the processors 36 through 37 are connected selectively in series or in parallel in the processor array.

Relation between eight sorts of the connection configurations and the connection modes of the first through the third switching devices 51 through 53 (FIG. 1) is shown in Table 1. In Table 1, "0" represents that a corresponding switching device is in a state of the parallel connection mode while "1" represents that a corresponding switching device is in another state of the series connection mode.

TABLE 1

Figure 3:
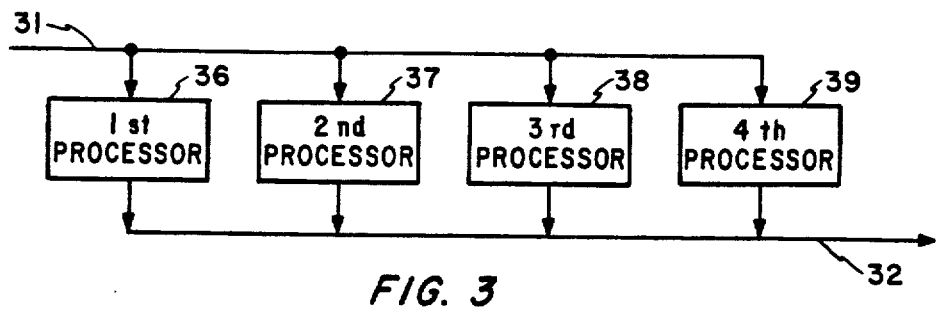
FIGS. 3 through 10 are block diagrams for use in describing various connection configurations of processors of the processor array illustrate in FIG. 1.
Figure 4:
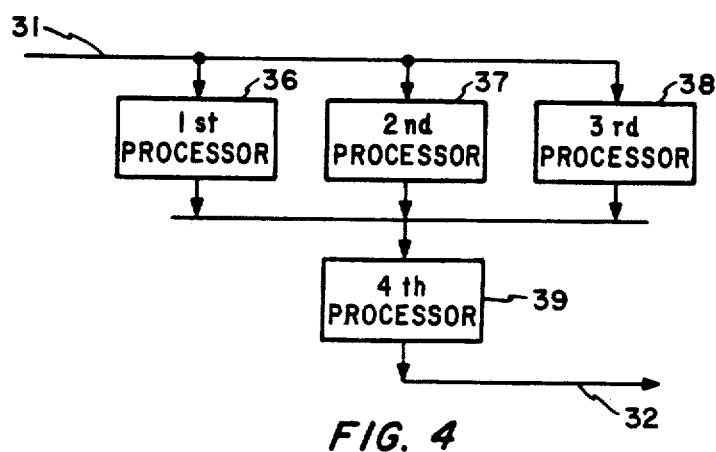
Figure 5:
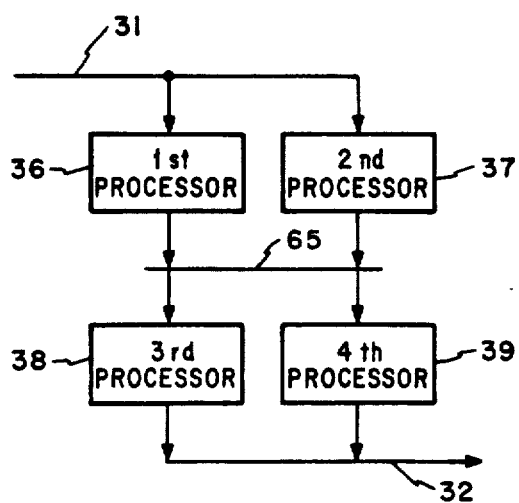
Figure 6:
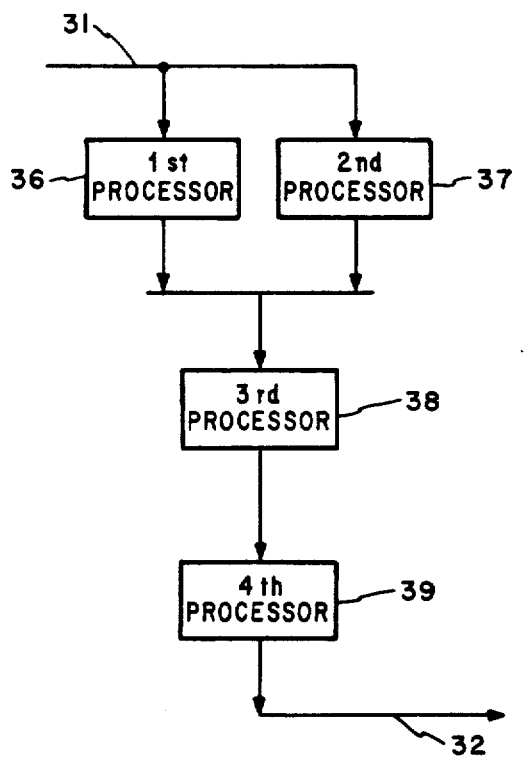
Figure 7:
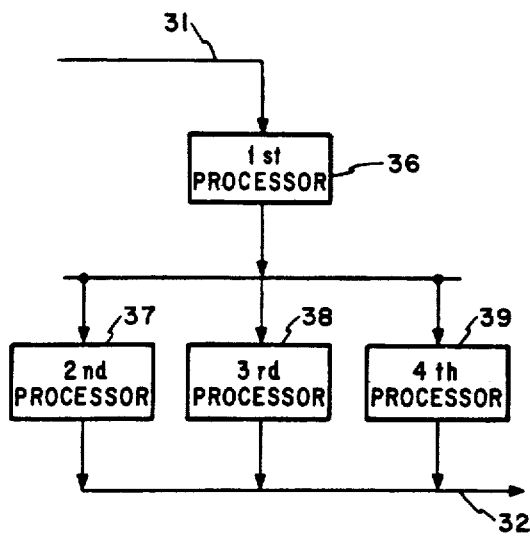
Figure 8:
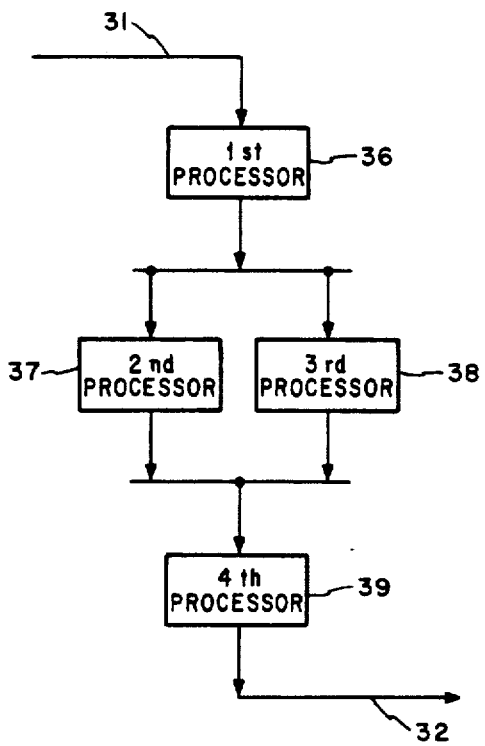
Figure 9:
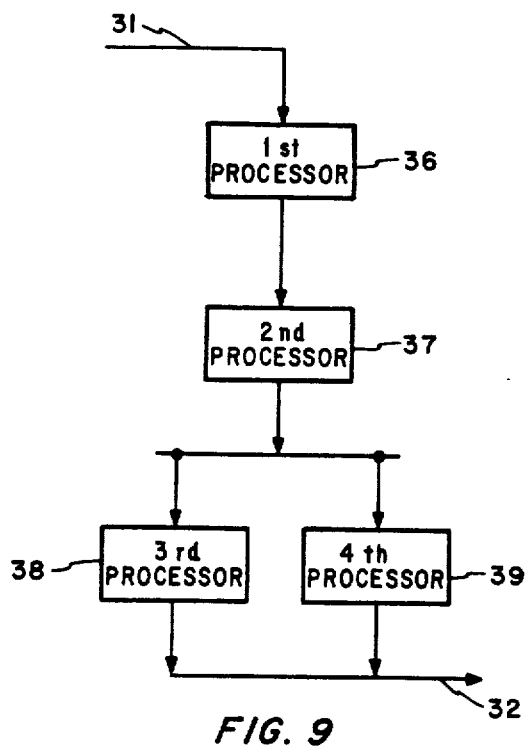
Figure 10:
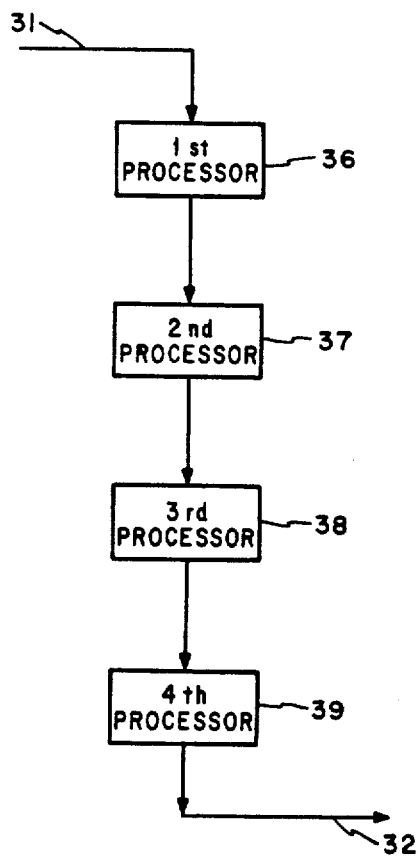

| SWITCHING DEVICE | | | |
|---|---|---|---|
| 51 | 52 | 53 | CORRESPONDING FIGURE |
| 0 | 0 | 0 | FIG. 3 |
| 0 | 0 | 1 | FIG. 4 |
| 0 | 1 | 0 | FIG. 5 |
| 0 | 1 | 1 | FIG. 6 |
| 1 | 0 | 0 | FIG. 7 |
| 1 | 0 | 1 | FIG. 8 |
| 1 | 1 | 0 | FIG. 9 |
| 1 | 1 | 1 | FIG. 10 |

For example, FIG. 5 is illustrative of the connection configuration realized in FIG. 1. In FIG. 5, a reference numeral 65 represents a bus realized by connecting, in series, a first combination of the processor output buses 42 of the first and the second processors 36 and 37 and a second combination of the processor input buses 41 of the third and the fourth processors 38 and 39.

Figure 11:
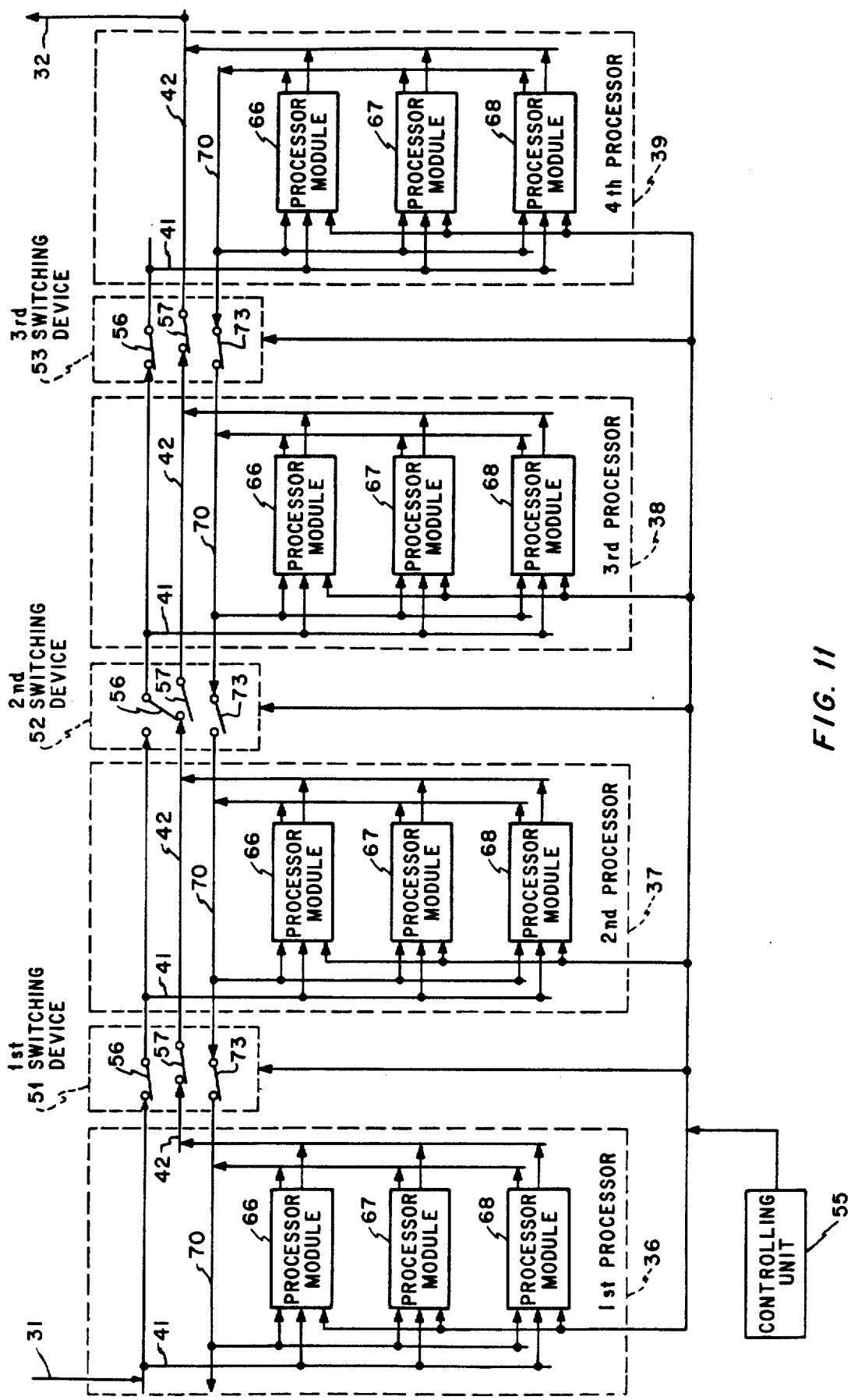
FIG. 11 is a block diagram of a processor array according to a second embodiment of this invention.

Referring to FIG. 11, a processor array according to a second embodiment of this invention comprises similar parts designated by like reference numerals. Each of the first through the fourth processors 36 through 39 comprises three processor modules 66, 67, and 68 connected between the processor input and output buses 41 and 42 and a feedback bus 70 connected to the three processor modules 66 through 68. Operation of the processor modules 66 through 68 will later be described.

Each of the first through the third switching devices 51 through 53 further comprises a third switching unit 73 connected between the feedback buses 70 of the preceding and the succeeding processors.

Attention will be directed to the first switching device 51. In the example being illustrated, the controlling unit 55 controls the first switching unit 56 of the first switching device 51 so that the processor input bus 41 of the preceding processor 36 is connected to the processor input bus 41 of the succeeding processor 37. The controlling unit 55 further controls the second switching unit 57 of the first switching device 51 so that the processor output bus 42 of the preceding processor 36 is connected to the processor output bus 42 of the succeeding processor 37. The controlling unit 55 still further controls the third switching unit 73 of the first switching device 51 so that the feedback bus 70 of the preceding processor 36 is connected to the feedback bus 70 of the succeeding processor 37 only when the controlling unit 55 controls the first switching unit 56 of the first switching device 51 so that the processor input bus 41 of the preceding processor 36 is connected to the processor input bus 41 of the succeeding processor 37. In this case, the preceding processor 36 and the succeeding processor 37 are connected in parallel as illustrated in FIG. 11. Therefore, such a connection mode of the switching device will be referred also as a parallel connection mode.

Attention will be directed to the second switching device 52. When the controlling unit 55 controls the first switching unit 56 of the second switching device 52 so that the processor output bus 42 of the preceding processor 37 is connected to the processor input bus 41 of the succeeding processor 38, the controlling unit 55 controls the third switching unit 73 of the second switching device 52 so that the feedback bus 70 of the preceding processor 37 is disconnected from the processor feedback bus 70 of the succeeding processor 38 as illustrated in FIG. 11. Inasmuch as the preceding 37 and the succeeding processor 38 are connected in series or in cascade in this case, such a connection mode of the switching device will be referred to also as a series connection mode.

The third switching device 53 carries out the parallel connection mode life the first switching device 51. That is, the third and the fourth processors 38 and 39 are connected in parallel by third switching device 53.

Thus, the controlling unit 55 is for controlling the first through the third switching devices 51 through 53 so that the feedback buses 70 of the first through the fourth processors 36 to 39 are selectively connected in series in compliance with the manner in which the processor input and output buses of the first through the fourth processors 36 to 39 are connected together.

As is readily understood from the above, the processor array carries out processing in a pipeline fashion having first and second pipeline stages in the state exemplified in FIG. 11. The first pipeline stage comprises six processor modules of the first and the second processors 36 and 37. The second pipeline stage comprises six processor modules of the third and the fourth processors 38 and 39.

Description will proceeds to an example of operation of the processor array illustrated in FIG. 11. An array input signal of the type described with reference to FIG. 1 is supplied through the array input bus 31 to the first and the second processors 36 and 37 as a first stage input signal of the first pipeline stage. The array input signal, that is, the first stage input signal, is in a form of a succession of principal blocks. As described with reference to FIG. 1, each principal block is in a form of at least one scanning line of the array input signal and has a time duration which is not longer than one picture or frame period of the array input signal. It will be assumed that each principal block is divisible into six partial blocks.

Inasmuch as the first and the second processors 36 and 37 are connected in parallel, the controlling unit 55 controls six processor modules of the first and the second processors 37 and 38 so that the six processor modules are in correspondence to the respective partial blocks of each principal block. Responsive to the first stage or array input signal supplied through the processor input bus 41 and a feedback signal which will presently be described, the six processor modules of the first and the second processors 36 and 37 process the respective partial blocks of each principal block into primary processed signals during the time duration, respectively. Each primary processed signal comprises first and second partial signals.

The first partial signals of the primary processed signals are supplied to the second pipeline stage as a second stage input signal of the second pipeline stage through the output buses 42 of the first and the second processors 36 and 37 and the first and the second switching devices 51 and 52. The second partial signals of the primary processed signals are supplied back as the feedback signal to the six processor modules of the first and the second processors 36 and 37 through the feedback buses 70 of the first and the second processors 36 and 37.

Similar operation is carried out in the second pipeline stage comprising the third and the fourth processors 38 and 39. That is, the processor modules of the third and the fourth processors 38 and 39 are respective to the second stage input signal and to a corresponding feedback signal for processing the respective partial blocks of each principal block of the second stage input signal into secondary processed signals during the time duration, respectively. Each secondary processed signal comprises first and second partial signals.

The first partial signals of the secondary processed signals are supplied to an external device (not shown) as an array output signal of the processor array through the output buses 42 of the third and the fourth processors 38 and 39, the third switching device 53, and the array output bus 32. The second partial signals of the secondary processed signals are supplied back as the corresponding feedback signal to the processor modules of the third and the fourth processors 38 and 39 through the feedback buses 70 of the third and the fourth processors 38 and 39.

Supposing that the principal blocks are the respective pictures of the array input signal, the six processor modules of one of the first and the second pipeline stages are used to process the respective partial blocks of each principal block or picture for the time duration of one picture period, respectively. In this case, the first pipeline stage can be used to carry out spatial and temporal filtering of the array input signal to produce a spatially and temporally filtered signal as the first stage output signal. The spatial and temporal filtering is executed to elevate correlation between pictures as mentioned heretobefore. The second pipeline stage can be used to carry out interframe coding on the spatially and the temporally filtered signal to produce a coded signal as the array output signal.

Alternatively, it will be assumed that each principal block is composed of either one line or a few lines of the array input signal. In this case, the processor modules of each of the first and the second pipeline stages are used to process the respective partial blocks of each principal block for the time duration of one line period or a few line periods, respectively. In this case, the first pipeline stage can be used to carry out filtering of the array input signal to produce a filtered signal as the first stage output signal. The second pipeline stage can be used to carry out intraframe coding on the filtered signal to produce another coded signal as the array output signal.

Figure 12:
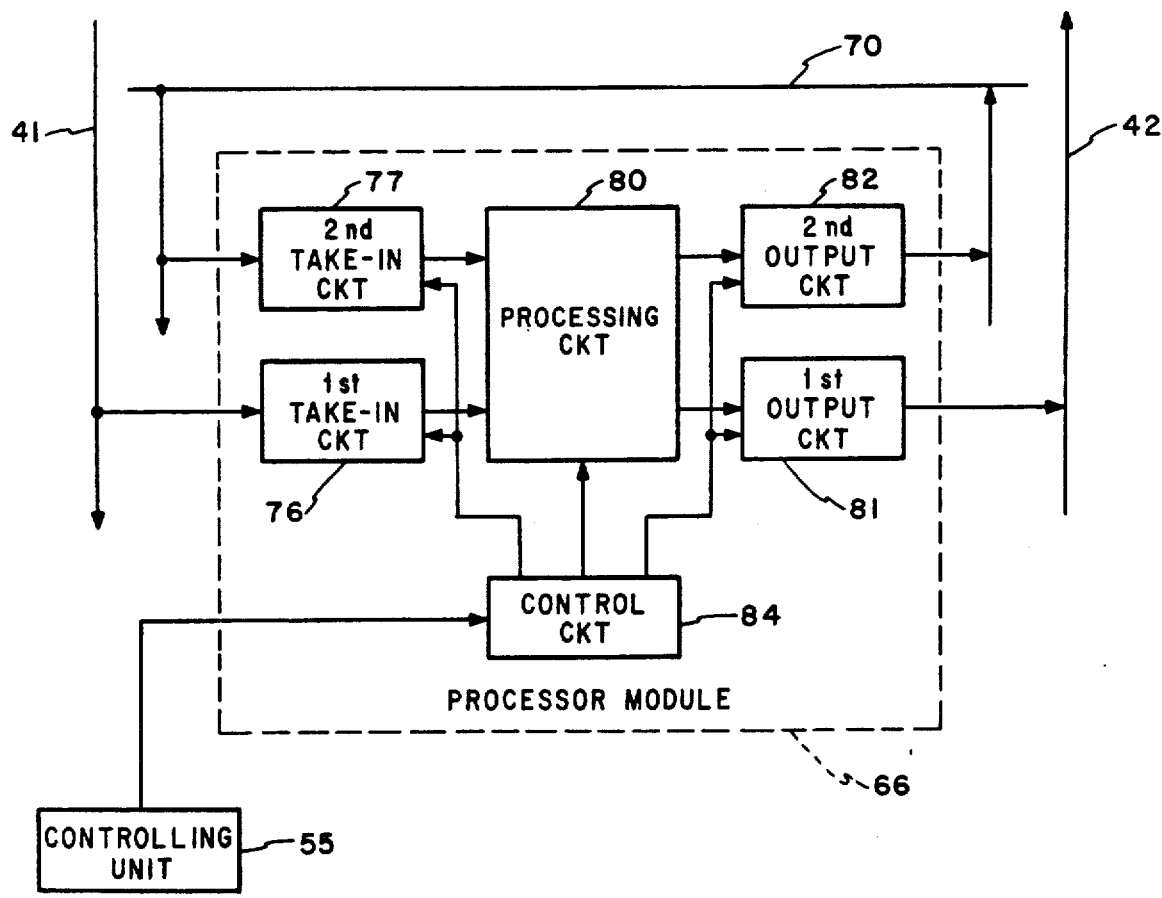
FIG. 12 is a block diagram of a processor module which is used in the array processor illustrated in FIG. 11.

Referring to FIG. 12, description will now be in detail as regards the processor module 66 of the first processor 36. It should be noted here that remaining processor modules of the first through the fourth processors 36 through 39 of the processor array illustrated in FIG. 11 are substantially same in structure as the processor module 66 of the first processor 36.

The processor module 66 under consideration comprises first and second take-in circuits 76 and 77, a processing circuit 80, first and second output circuits 81 and 82, and a control circuit 84.

The control circuit 84 decodes a command produced by the controlling unit 55 and controls operation of the first and the second take-in circuits 76 and 77, the processing circuit 80, and the first and the second output circuits 81 and 82.

The processing circuit 80 comprises a microcomputer and a program memory (not shown) for storing a program. The program is preliminarily supplied to the program memory from the controlling unit 55 through the control circuit 84.

Each of the first and the second take-in circuits 76 and 77 comprises an input data memory (not shown). In accordance with a first instruction signal received from the control circuit 84, the first take-in circuit 76 writes data (namely, the partial block) from the processor input bus 41 in the input data memory thereof. Likewise, the second take-in circuit 76 writes data (namely, the feedback signal) from the feedback bus 70 in the input data memory thereof in accordance with the first instruction signal.

The control circuit 84 supplies a second instruction signal to the processing circuit 80 when each of the first and the second take-in circuits 76 and 77 takes in the data which are needed for processing by the processing circuit 80. The microcomputer of the processing circuit 62 reads the data out of the input data memories of the first and the second take-in circuits 76 and 77 in accordance with the second instruction signal. The processing circuit 80 is used to process the data into the above-mentioned primary processed signal during the time duration. As mentioned above, the primary processed signal comprises first and second partial signals.

Each of the first and the second output circuits 81 and 82 comprises an output data memory (not shown). The first output circuit 81 writes the first partial signal in the output data memory thereof. Likewise, the second output memory 82 writes the second partial signal in the output data memory thereof. In accordance with a third instruction signal received from the control circuit 84, the first output circuit 81 reads the first partial signal out of the output data memory thereof to deliver the first partial signal to the processor output bus 42. Likewise, the second output circuit 82 is responsive to the third instruction signal for reading the second partial signal out of the output data memory thereof to deliver the second partial signal to the feedback bus 70 as the feedback signal.

Similar operation is carried out by the remaining processor modules of the first through the fourth processors 36 to 39 illustrated in FIG. 11.

In the processor array illustrated in FIG. 11, it is also possible to realize eight sorts of the connection configurations by switching the three switching devices 51, 52, and 53 like in the processor array illustrated in FIG. 1. All of the eight sorts of connection configurations are illustrated in FIGS. 13 through 20.

Relation between the eight sorts of the connection configurations and the connection modes of the first through the third switching devices 51 through 53 (FIG. 11) is shown in Table 2. In Table 2, "0" represents that a corresponding switching device is in a state of the parallel connection mode while "1" represents that a corresponding switching device is in another state of the series connection mode.

TABLE 2

Figure 13:
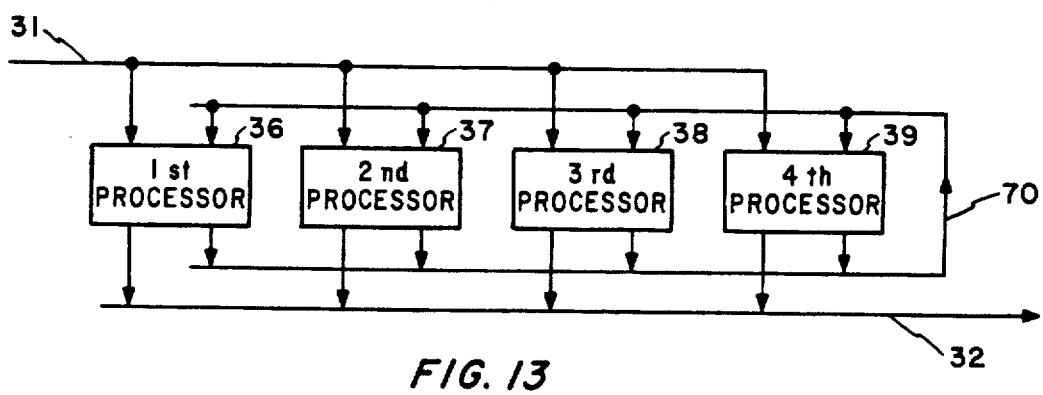
FIGS. 13 through 20 are block diagrams for use in describing various connection configurations of processors of the processor array illustrated in FIG. 11.
Figure 14:
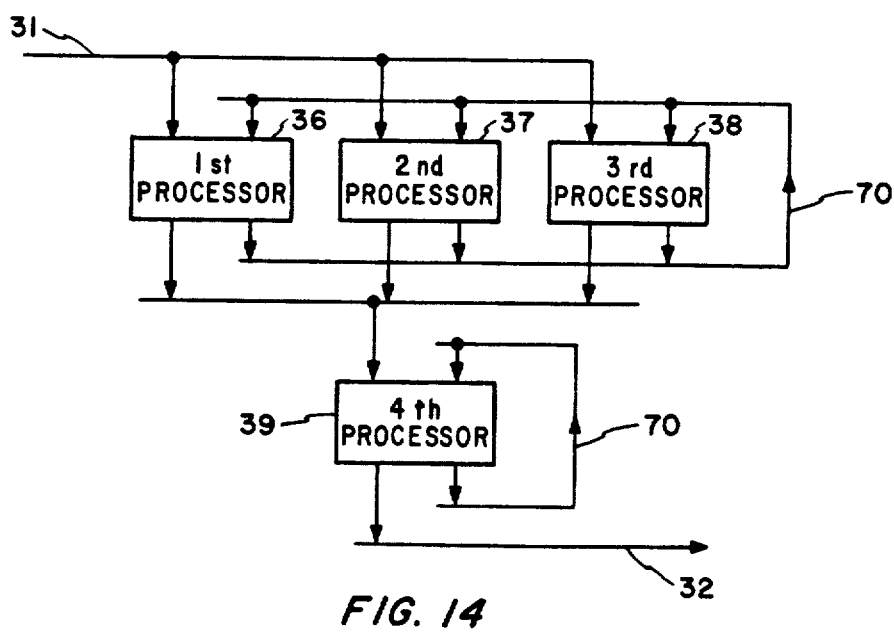
Figure 15:
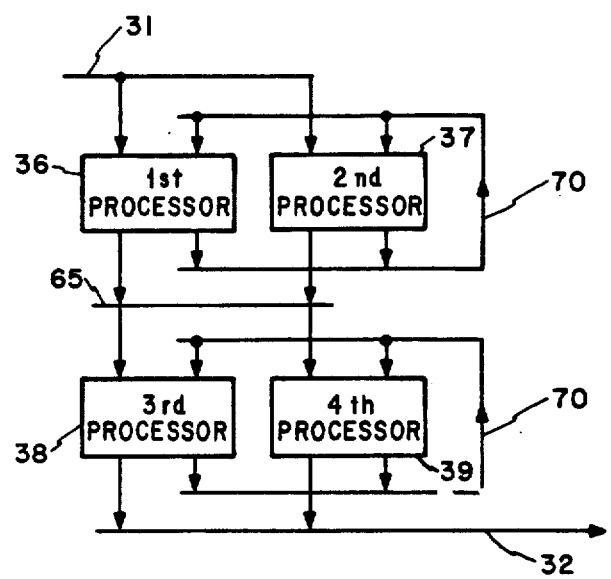
Figure 16:
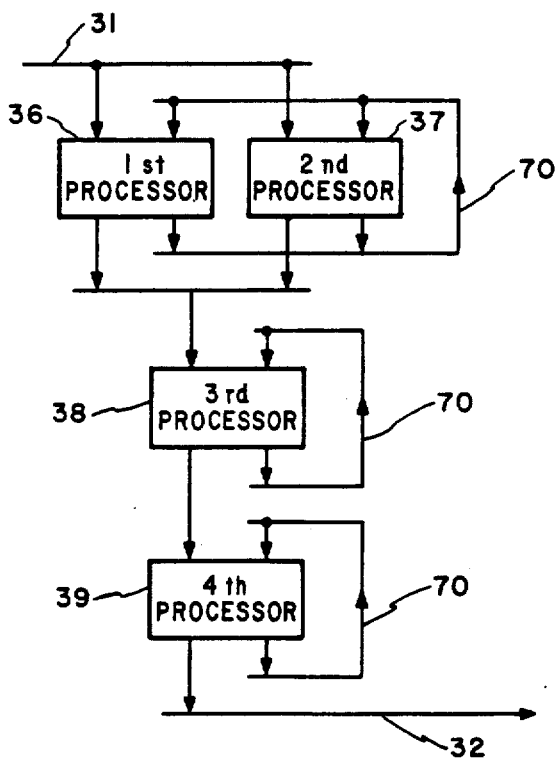
Figure 17:
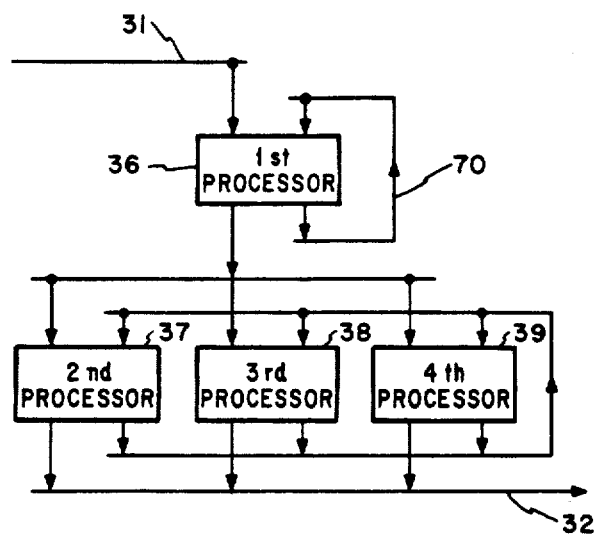
Figure 18:
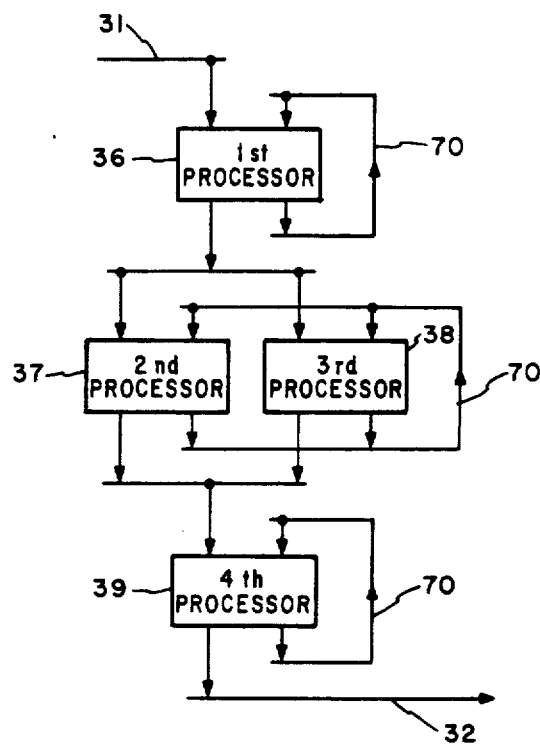
Figure 19:
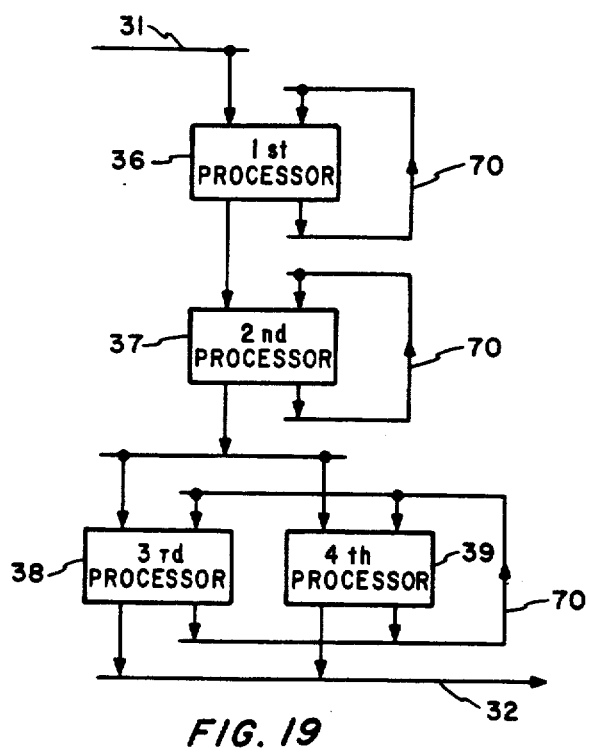
Figure 20:
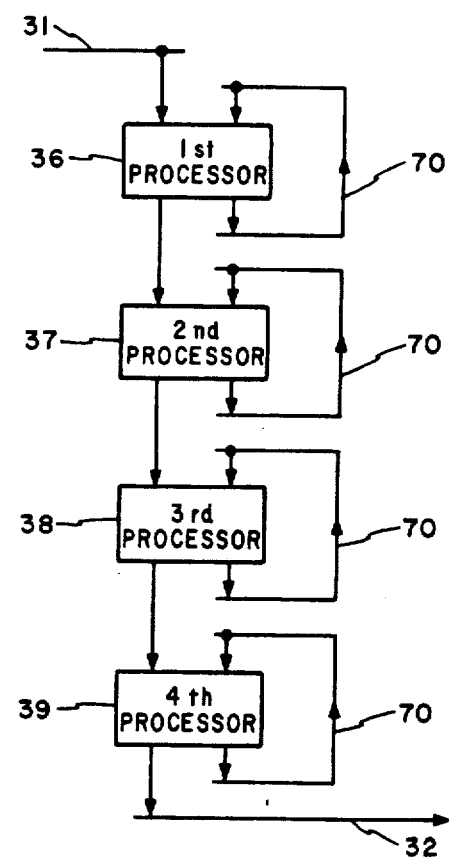

| SWITCHING DEVICE | | | |
|---|---|---|---|
| 51 | 52 | 53 | CORRESPONDING FIGURE |
| 0 | 0 | 0 | FIG. 13 |
| 0 | 0 | 1 | FIG. 14 |
| 0 | 1 | 0 | FIG. 15 |
| 0 | 1 | 1 | FIG. 16 |
| 1 | 0 | 0 | FIG. 17 |
| 1 | 0 | 1 | FIG. 18 |
| 1 | 1 | 0 | FIG. 19 |
| 1 | 1 | 1 | FIG. 20 |

For example, FIG. 15 is illustrative of the connection configuration realized in FIG. 11.

While this invention has thus far been described in conjunction with a few embodiments thereof, it will readily be possible for those skilled in the art to put this invention into practice in various other manners. Above all, it is possible to put each processor module of FIG. 1 or 11 into operation repeatedly in each time duration in a time division fashion under the control of the controlling unit 55. In this event, each of the processors 36 through 39 may have only one processor module. Alternatively, it is possible to put the processor module of at least one processor in the time division fashion with the processor module or modules of at least one remaining processor put into operation only once in each time duration.

What is claimed is:
1. A processor array comprising:
an array input bus;
an array output bus;

first through N-th processors, N being representative of a predetermined integer which is at least two, each processor comprising a processor input bus, a processor output bus, and at least one processor module means coupled between said processor input and output buses, the processor input bus of said first processor being connected to said array input bus, the processor output bus of said N-th processor being connected to said array output bus;

first through (N-1)-th switching devices, each switching device being physically located between a preceding and a succeeding processor of two consecutively numbered ones of said first through said N-th processors, each of said first through said (N-1)-th switching devices comprising a first and a second switching unit, each of which is physically located between said preceding and said succeeding processors; and controlling means for controlling the first switching unit of each of said first through said (N-1)-th switching devices so that one of the processor input and output buses of said preceding processor is selectively and physically connected to the processor input bus of said succeeding processor, said controlling means for further controlling the second switching unit of said each of said first through said (N-1)-th switching devices sot that the processor output bus of said preceding processor is coupled to the processor output bus of said succeeding processor only when said controlling means controls the first switching unit of said each of said first through said (N-1)-th switching devices so that the processor input bus of said preceding processor is connected to the processor input bus of said succeeding processor.

2. A processor array as claimed in claim 1, each processor comprising at least two processor module means, wherein said controlling means is for further controlling the processor module means of each processor so that the processor module means of each processor are selectively operable.

3. A processor array as claimed in claim 2, said array input bus being for supplying the processor input bus of said first processor with an array input signal which has a frame period and is a digital video signal of a form of a succession of principal blocks, each principal block being divided into at least two partial blocks and having a time duration which is not longer than said frame period, each processor comprising a plurality of processor module means in correspondence with the respective partial blocks of each principal block, wherein said controlling means is for controlling the processor module means of each processor so that the processor module means of each processor are selectively operable only once in each time duration.

4. A processor array as claimed in claim 1, said array input bus being for supplying the processor input bus of said first processor with an array input signal which has a frame period and is a digital video signal of a form of a succession of principal blocks, each principal block being divided into at least two partial blocks and having a time duration which is not longer than said frame period, wherein said controlling means is for further controlling the processor module means of said first through said N-th processors selectively operable so that said at least one processor module means of each processor is repeatedly operable in a time division fashion of processing the partial blocks of each principal block in said time duration.

5. A processor array as claimed in claim 1, said array input bus being for supplying the processor input bus of said first processor with an array input signal which has a frame period and is a digital video signal of a form of a succession of principal blocks, each principal block being divided into at least two partial blocks and having a time duration which is not longer than said frame period, wherein said controlling means is for further controlling the processor module means of said first through said N-th processors selectively operable so that said at least one processor module means of a predetermined at least one of said first through said N-th processors is operable a predetermined number of times in each time duration to process the partial blocks of each principal block, said predetermined number being not less in number than said at least two partial blocks of each principal block.

6. A processor array as claimed in claim 1, wherein:
each processor further comprises a feedback bus connected to said at least one processor module means;
each of said first through said (N-1)-th switching devices further comprising a third switching unit physically located between said preceding and said succeeding processors;
said controlling means still further controlling the third switching unit of said each of said first through said (N-1)-th switching devices sot that the feedback bus of said succeeding processor is physically connected to the feedback bus of said succeeding processor only when said controlling means controls the first switching unit of said each of said first through said (N-1)-th switching devices so that the processor input bus of said preceding processor is connected to the processor input bus of said succeeding processor.

7. A processor array as claimed in claim 6, each processor comprising at least two processor module means, wherein said controlling means is for further controlling the processor module means of each processor so that the processor module means of each processor are selectively operable.

8. A processor array as claimed in claim 7, said array input bus being for supplying the processor input bus of said first processor with an array input signal which has a frame period and is a digital video signal of a form of a succession of principal blocks, each principal block being divided into at least two partial blocks and having a time duration which is not longer than said frame period, each processor comprising a plurality of processor module means in correspondence with the respective partial blocks of each principal block, wherein said controlling means is for controlling the processor module means of each processor so that the processor module means of each processor are selectively operable only one in each time duration.

9. A processor array as claimed in claim 6, said array input bus being for supplying the processor input bus of said first processor with an array input signal which has a frame period and is a digital video signal of a form of a succession of principal blocks, each principal block being divided into at least two partial blocks and having a time duration which is not longer than said frame period, wherein said controlling means is for further controlling the processor module means of said first through said N-th processors selectively operable so that said at least one processor module means of each processor is repeatedly operable in time division fashion of procession the partial blocks of each principal block in said time duration.

10. A processor array as claimed in claim 6, said array input bus being for supplying the processor input bus of said first processor with an array input signal which has a frame period and is a digital video signal of a form of a succession of principal blocks, each principal block being divided into at least two partial blocks and having a time duration which is not longer than said frame period, wherein said controlling means is for further controlling the processor module means of said first through said N-th processors selectively operable so that said at least one processor module means of a predetermined at least one of said first through said N-th processors is operable a predetermined number of times in each time duration to process the partial blocks of each principal block, said predetermined number being not less in number than said at least two partial blocks of each principal block.

* * * * *